(12) United States Patent
Kaida et al.

(10) Patent No.: US 8,836,850 B2
(45) Date of Patent: Sep. 16, 2014

(54) IMAGE COMPOSITION APPARATUS AND IMAGE COMPOSITION METHOD

(71) Applicant: Canon Kabushiki Kaisha, Tokyo (JP)

(72) Inventors: Hironori Kaida, Kawasaki (JP); Jun Makino, Kokubunji (JP)

(73) Assignee: Canon Kabushiki Kaisha (JP)

( * ) Notice: Subject to any disclaimer, the term of this patent is extended or adjusted under 35 U.S.C. 154(b) by 15 days.

(21) Appl. No.: 13/786,761

(22) Filed: Mar. 6, 2013

(65) Prior Publication Data

US 2013/0235257 A1      Sep. 12, 2013

(30) Foreign Application Priority Data

Mar. 7, 2012  (JP) ................ 2012-050282

(51) Int. Cl.
*H04N 5/235* (2006.01)
*G03B 7/00* (2014.01)
*H04N 5/355* (2011.01)

(52) U.S. Cl.
CPC .......... *H04N 5/2353* (2013.01); *H04N 5/2355* (2013.01); *H04N 5/35536* (2013.01); *H04N 5/2351* (2013.01); *H04N 5/2352* (2013.01)
USPC .............. 348/362; 348/221.1; 348/222.1; 348/229.1

(58) Field of Classification Search
CPC .......... H04N 5/35536; H04N 5/35545; H04N 5/35554; H04N 5/35563
USPC ................... 348/362, 221.1, 222.1, 229.1
See application file for complete search history.

(56) References Cited

U.S. PATENT DOCUMENTS

| 7,561,731 | B2 * | 7/2009 | Wallace et al. | 382/154 |
| 2007/0229698 | A1 * | 10/2007 | Kakinuma et al. | 348/362 |
| 2008/0253758 | A1 * | 10/2008 | Yap et al. | 396/234 |
| 2009/0086085 | A1 * | 4/2009 | Asoma | 348/362 |
| 2011/0069205 | A1 * | 3/2011 | Kasai et al. | 348/239 |
| 2013/0242152 | A1 * | 9/2013 | Kasai | 348/294 |
| 2013/0251283 | A1 * | 9/2013 | Atanassov et al. | 382/260 |

FOREIGN PATENT DOCUMENTS

| JP | 08-154201 A | 6/1996 |
| JP | 2009-147588 A | 7/2009 |

* cited by examiner

*Primary Examiner* — Nelson D. Hernández Hernández
(74) *Attorney, Agent, or Firm* — Rossi, Kimms & McDowell LLP

(57) ABSTRACT

An image composition apparatus that is capable of acquiring a high-quality composite image that keeps continuity of the gradation of the whole image. Different exposures are set for images to be taken. Each of taken images is divided into small regions. A measured value is found based on brightness values in each of the small regions. A comparison value for each of the small regions is calculated based on the measured value of a small region of one image and the measurement value of the same small region of another image. A representative value is calculated based on the comparison values calculated for the respective small regions. A level-matching gain used for compositing the image data of the images is calculated based on an exposure level difference and the representative value. The image data of the images of which the image levels are adjusted are composited by multiplying the gain.

11 Claims, 9 Drawing Sheets

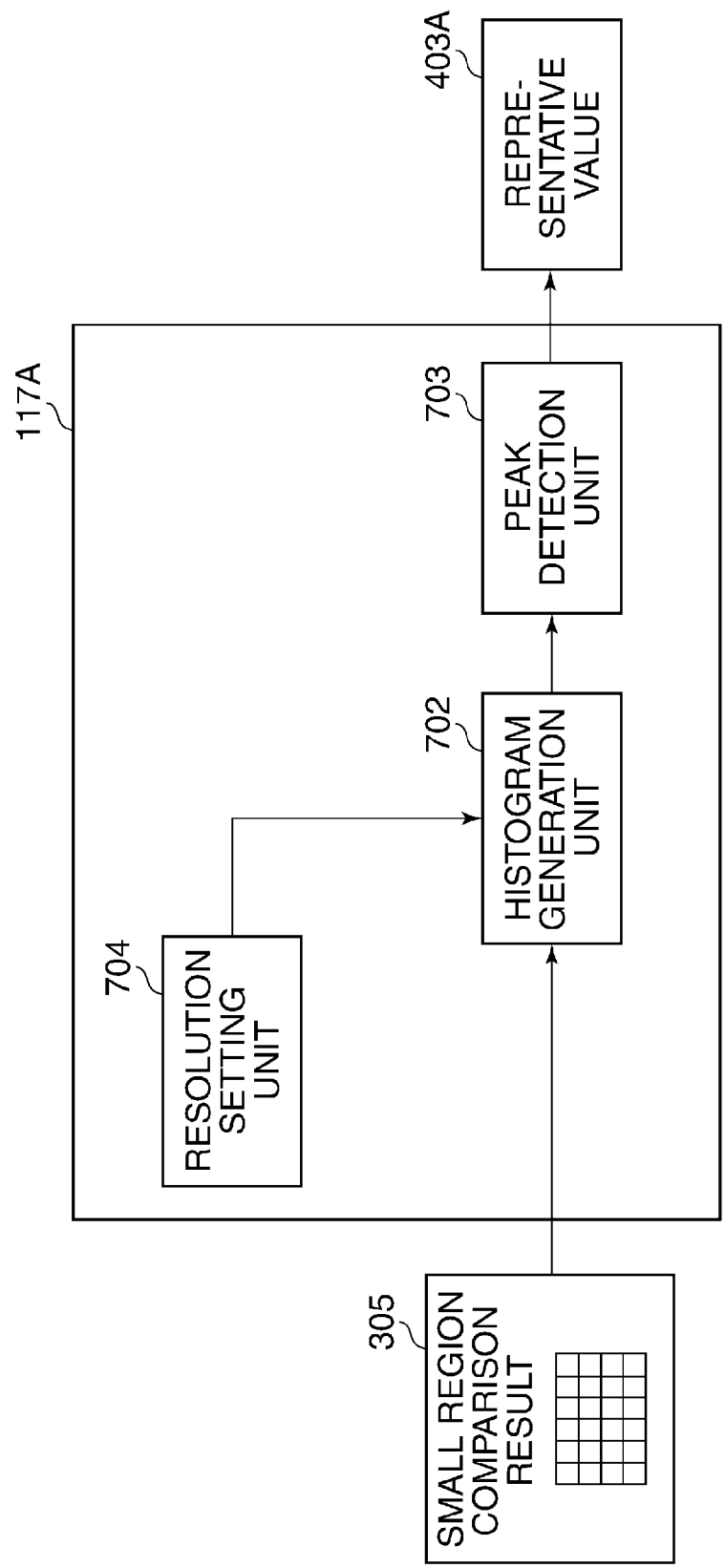

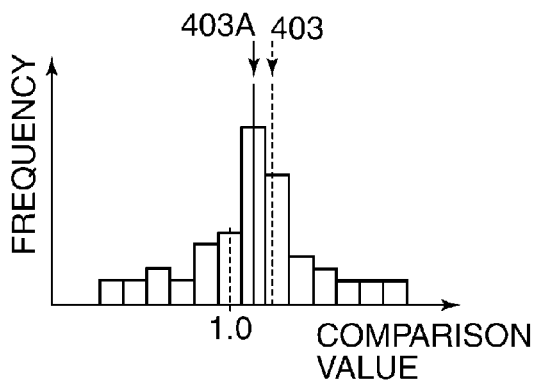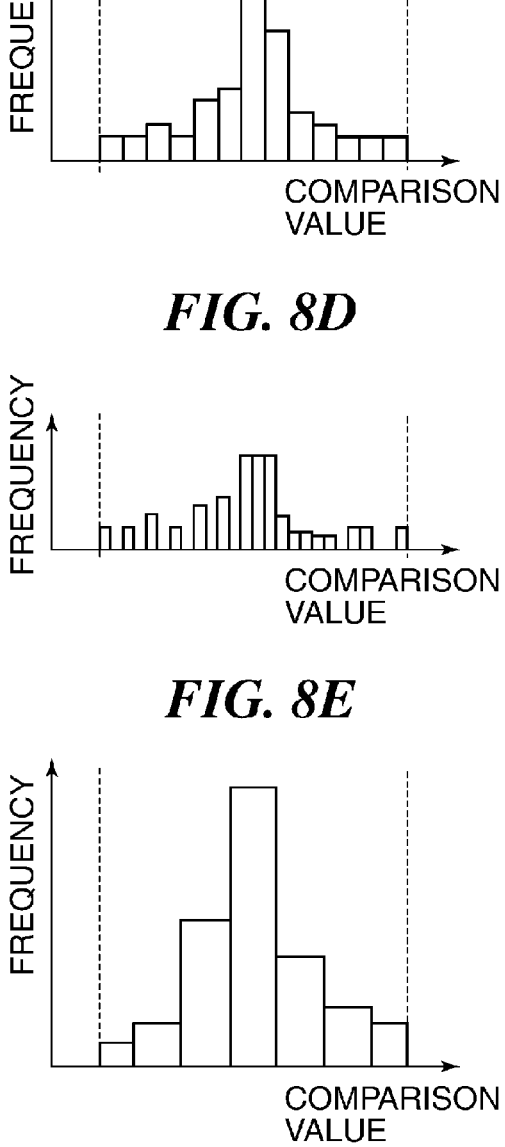

IMAGE COMPOSITION APPARATUS AND IMAGE COMPOSITION METHOD

BACKGROUND OF THE INVENTION

1. Field of the Invention

The present invention relates to an image composition apparatus and an image composition method that take a plurality of images and composite them into one image. And particularly, the present invention relates to a level-matching technique at the time of compositing a plurality of images.

2. Description of the Related Art

There is a known image composition method that enlarges a dynamic range by taking a plurality of images in different exposures and compositing the taken images. When images are composited in such a manner, a composition process is performed after adjusting levels of the taken images so that the image levels match.

However, the conventional image composition apparatus is difficult to composite images properly when a low exposure image and a high exposure image are taken with exposures that are different from a setting level difference. For example, if shutter speed at the time of taking an image differs from correct speed under influence of a mechanism error etc., images are taken with exposures different from the setting level difference. Accordingly, even if the level matching is performed according to the setting level difference, the image levels of the low exposure image and the high exposure image become different, which decreases an accuracy of process, such as motion detection.

Regarding such a problem, Japanese Laid-Open Patent Publication (Kokai) No. H8-154201 (JP H8-154201A) discloses a technique that calculates a gain ratio based on image signals in a fixed range of an input level and matches the gains of the image signals.

Although the technique disclosed in JP H8-154201A adjusts the gain in the level range in which the input levels of two images to be composited, the images are composited without adjusting the gain in another level range. That is, the technique does not adjust the levels with a fixed gain over the entire area of the image.

Accordingly, when a moving subject exists in a taken image, and when levels overlapping the subject in the image and other levels are intermingled, the levels overlapping the subject in the image and the other levels are adjusted in the different gains, respectively. As a result, pixel values over the boundary do not smoothly vary, and an unnatural image will be generated. When a moving subject is included in a taken image, the adjustment for the moving subject and that for a background may be performed with different gains. In such a case, a difference value of an image varies depending on the brightness of the moving image, which disturbs suitable motion detection.

Japanese Laid-Open Patent Publication (Kokai) No. 2009-147588 (JP 2009-147588A) discloses a technique that acquires an image with a suitable image level by calculating a difference between an evaluation metering value of a taken image and a target evaluation metering value, and amplifying the taken image signal based on the calculated difference.

The technique disclosed in this publication acquires a correct exposure image by applying a sensitivity calibration afterwards to the taken image data. That is, although JP 2009-147588A does not disclose a technique for compositing two images, it discloses a technique that acquires the evaluation metering value about the taken image by dividing the taken image data into the predetermined number of areas, calculating average of brightness values for every divided area, and assigning weights. Specifically, the technique acquires image data with a correct exposure by calculating the evaluation metering value from the image data that was taken beforehand, taking a main image data with the exposure corresponding to the evaluation metering value, calculating a difference between the calculated evaluation metering value and an evaluation value of a correct exposure, and calibrating the sensitivity of the main image data.

However, this method changes the evaluation metering value about the whole image when the taken image includes a moving subject and a part of a subject in the image moves (varies). Accordingly, if the sensitivity calibration is performed according to the evaluation metering value, other subjects that did not move (do not vary) are affected.

SUMMARY OF THE INVENTION

The present invention provides an image composition apparatus that is capable of acquiring a high-quality composite image that keeps continuity of the gradation of the whole image.

Accordingly, a first aspect of the present invention provides an image composition apparatus comprising an image pickup unit configured to take an optical image of a subject, an exposure-level-difference setting unit configured to set different exposures when the images are taken, a small region measuring unit configured to divide each of the images taken by the image pickup unit with the exposures set by the exposure-level-difference setting unit into small regions, and to find a measured value based on brightness values in each of the small regions, a small region comparing unit configured to calculate a comparison value for each of the small regions based on the measured value of a small region of one image and the measurement value of the same small region of another image, a representative value calculation unit configured to calculate a representative value based on the comparison values calculated for the respective small regions, a level setting unit configured to set a level-matching gain used for compositing the image data of the images based on an exposure level difference set by the exposure-level-difference setting unit and the representative value calculated by the representative value calculation unit, and a composition unit configured to composite the image data of the images of which the image levels are adjusted by multiplying the gain set by the level setting unit.

Accordingly, a second aspect of the present invention provides an image composition method executed with an image composition apparatus having an image pickup unit that takes an optical image of a subject, the method comprising an exposure-level-difference setting step of setting different exposures when the image pickup unit takes images of the subject, an image pickup step of taking images of the subject with the exposures set in the exposure-level-difference setting step, a small region measuring step of dividing each of the images taken in the image pickup step, and of finding a measured value based on brightness values in each of the small regions, a small region comparing step of calculating a comparison value for each of the small regions based on the measured value of a small region of one image and the measurement value of the same small region of another image, a representative value calculation step of calculating a representative value based on the comparison values calculated for the respective small regions, a level setting step of setting a level-matching gain used for compositing the image data of the images based on the exposure level difference set in the exposure-level-difference setting step and the representative value calculated in the representative value calculation step, and a composition step of compositing the image data of the images of which the image levels are adjusted by multiplying the gain set in the level setting step.

According to the present invention, a high-quality composite image that keeps continuity of the gradation of the whole image can be generated.

Further features of the present invention will become apparent from the following description of exemplary embodiments with reference to the attached drawings.

BRIEF DESCRIPTION OF THE DRAWINGS

FIG. 7 is a view schematically showing a configuration of a representative-value-calculation unit with which an image composition apparatus according to a second embodiment is provided.

FIG. 8A through FIG. 8E are graphs showing examples of frequency distributions that are calculated by the representative-value-calculation unit in FIG. 7.

DESCRIPTION OF THE EMBODIMENTS

Hereafter, embodiments according to the present invention will be described in detail with reference to the drawings.

For example, a cellular phone and a handheld game machine that have a camera function, a digital still camera, etc. are concretizations of an image composition apparatus of this embodiment.

When compositing images (a low exposure image and a high exposure image) that were taken with different exposures, the image composition apparatus of the first embodiment matches levels of image data while considering an error of actual exposure (exposure error) to a set-up exposure level difference (setting level difference).

Figure 1:
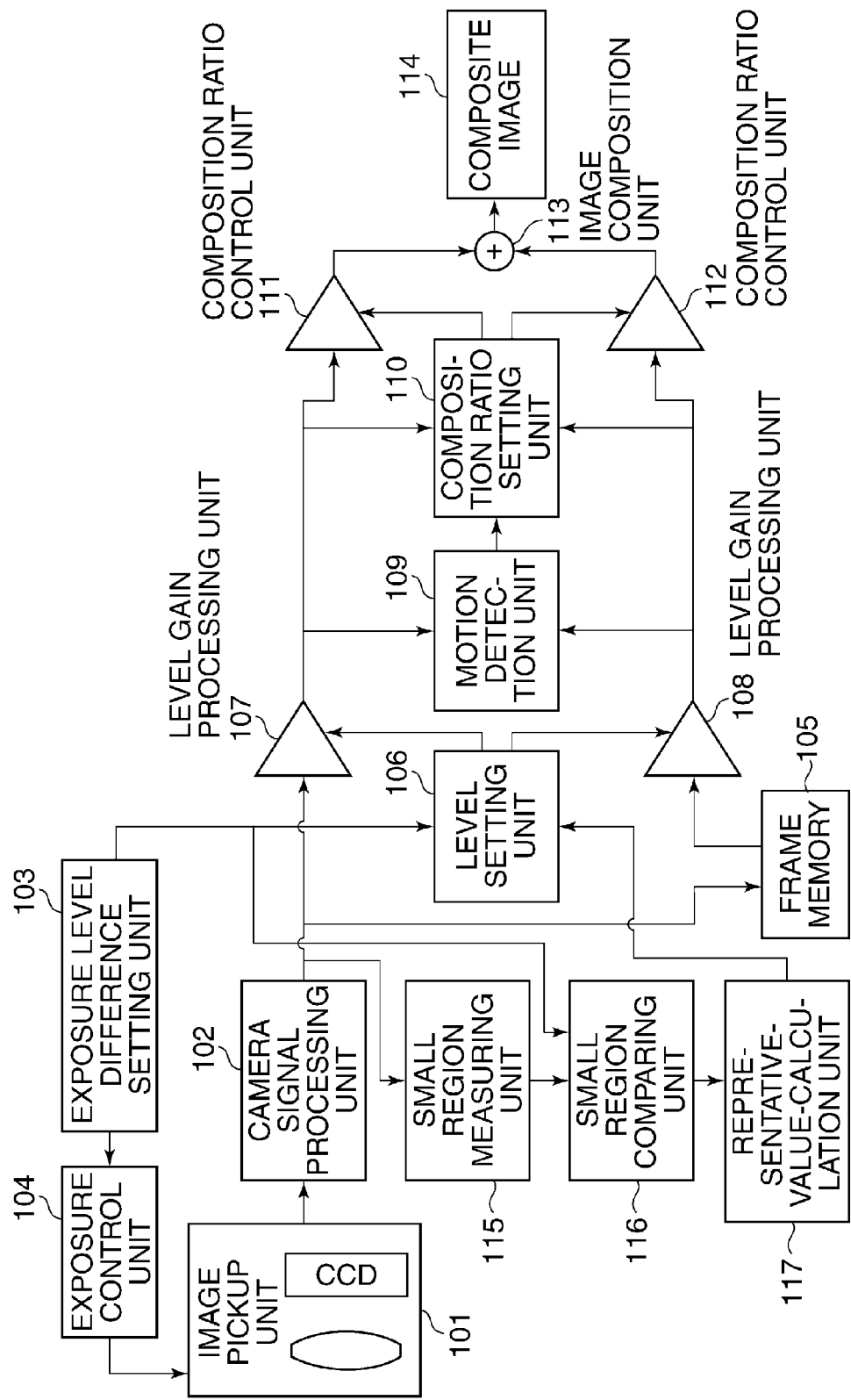
FIG. 1 is a block diagram schematically showing a configuration of an image composition apparatus according to a first embodiment of the present invention.

FIG. 1 is a block diagram schematically showing a configuration of the image composition apparatus according to the first embodiment. This image composition apparatus is provided with an image pickup unit 101, a camera signal processing unit 102, an exposure level difference setting unit 103, an exposure control unit 104, and a frame memory 105.

The image pickup unit 101 comprises a lens, a diaphragm, an image sensor, a sensor gain section, etc., and outputs a taken image as an image signal. The camera signal processing unit 102 generates a luminance signal and chrominance signals from the image signal outputted from the image pickup unit 101. The luminance signal (Y) is converted from the chrominance signals of RGB. However, since each of the chrominance signals of RGB has information about the luminosity of an image as an independent signal, it can be used in place of the luminance signal. In the following description, various types of data with the information about luminosity will be described as image data. Although a CCD is shown in FIG. 1 as the image sensor with which the image pickup unit 101 is provided, the image sensor is not limited to the CCD, and a CMOS or the like may be used.

The exposure level difference setting unit 103 sets an exposure value for shooting. The exposure control unit 104 controls the exposure value of the image pickup unit 101 according to instructions from the exposure level difference setting unit 103. The frame memory 105 stores the taken image data temporarily.

The exposure level difference setting unit 103 sets the exposure level difference for a low exposure as "−2 steps" to a correct exposure, for example. The exposure control unit 104 controls the exposure value of the image pickup unit 101 so that the exposure value becomes "−2 steps" as instructed. For example, a quarter exposure time is set to shutter speed when only shutter speed is controlled, an aperture value narrower by 2 steps is set when only the diaphragm is controlled, or a quarter-gain is set to the sensor gain section when only the sensor gain is controlled. Alternatively, the settings of the shutter speed, the aperture value, and the sensor gain are combined so that the exposure value becomes "−2 steps". The image pickup unit 101 takes a low exposure image with the set exposure value, and outputs an image signal. The camera signal processing unit 102 generates low exposure image data from the image signal outputted from the image pickup unit 101, and stores it into the frame memory 1005 temporarily.

Next, the exposure level difference setting unit 103 sets the exposure level difference of a high exposure as "+2 steps" relative to the correct exposure, for example. The exposure control unit 104 controls the exposure value of the image pickup unit 101 so that the exposure value becomes "+2 steps" as instructed. For example, a fourfold exposure time is set to shutter speed when only shutter speed is controlled, an aperture value wider by 2 steps is set when only the diaphragm is controlled, a fourfold gain is set to the sensor gain section when only the sensor gain is controlled. Alternatively, the settings of the shutter speed, the aperture value, and the sensor gain are combined so that the exposure value becomes "+2 steps". The image pickup unit 101 takes a high exposure image with the set exposure value, and outputs an image signal. The camera signal processing unit 102 generates high exposure image data from the image signal outputted from the image pickup unit 101.

The image composition apparatus concerning the first embodiment is provided with a small region measuring unit 115, a small region comparing unit 116, and a representative-value-calculation unit 117.

The small region measuring unit 115 divides the low exposure image data and the high exposure image data, which are outputted from the camera signal processing unit 102, into a plurality of small regions of a certain size, respectively, and measures a brightness value of each of the divided small regions. The small region comparing unit 116 receives the measured value for every divided small region of the image data from the small region measuring unit 115, compares a measured value at a certain position in the low exposure image data and a measured value at the same position in the high exposure image data for every small region, and outputs a small region comparison result. The representative-valuecalculation unit 117 receives a small region comparison result from the small region comparing unit 116, and calculates a representative value that is used for setting a level matching gain.

The image composition apparatus according to the first embodiment has a level setting unit 106 and level gain processing units 107 and 108. The level setting unit 106 sets levels of the level gain processing units 107 and 108 in order to match the levels of the low exposure image data and the high exposure image data at the time of compositing two images (a low exposure image and a high exposure image). The level setting unit 106 sets the level-matching gain, which is used for the level-matching process applied to the image data, based on the exposure level difference setting information from the exposure level difference setting unit 103 and the representative value determined by the representative-value-calculation unit 117. The level gain processing units 107 and 108 adjusts image levels according to instructions from the level setting unit 106.

The image composition apparatus according to the first embodiment is further provided with a motion detection unit 109, a composition ratio setting unit 110, composition ratio control units 111 and 112, and an image composition unit 113. The motion detection unit 109 detects motion information in the image by acquiring difference information etc. about the two images of which levels were matched. The composition ratio setting unit 110 sets the composition ratio for compositing the two images. The composition ratio control units 111 and 112 adjust the composition ratios of the images according to the instructions from the composition ratio setting unit 110. The image composition unit 113 adds the two sets of image data that were multiplied by the composition ratios. As a result, a composite image 114 is generated.

Figure 2:
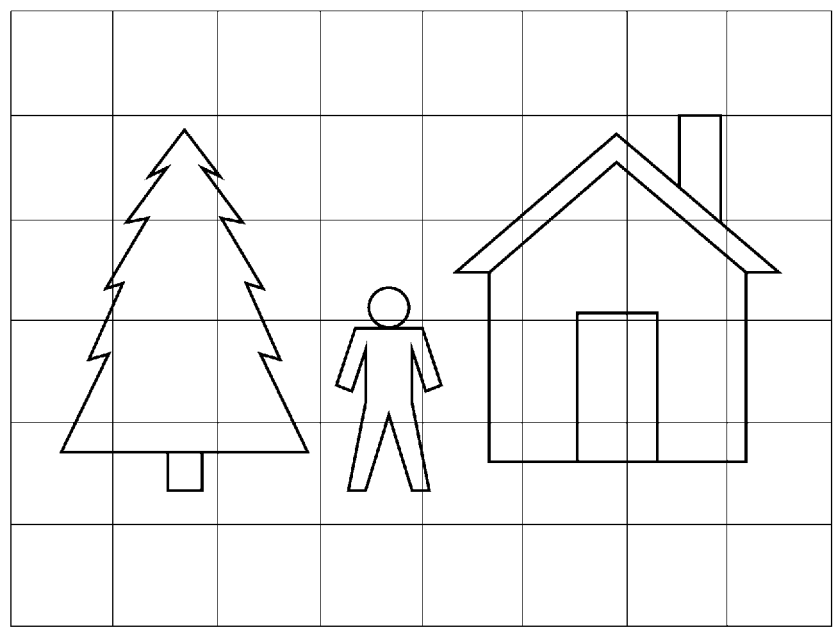
FIG. 2 is a view showing an example that divides an image into a plurality of small regions with a small region measuring unit shown in FIG. 1.

FIG. 2 is a view showing an example that divides an image into a plurality of small regions with the small region measuring unit 115. In this example, the image is divided into 6 parts in the vertical direction and 8 parts in the horizontal direction, that is, into 48 regions in total. The small region measuring unit 115 measures brightness values for each of divided small regions, and outputs the measurement values to the small region comparing unit 116. The small region measuring unit 115 calculates an average value of the brightness values for every small region, for example. However, the small region measuring unit 115 may calculate the maximum value or the minimum value of the brightness values in the small region rather than calculates the average value of the brightness values. When the image is divided into the 48 small regions as shown in FIG. 2, the small region measuring unit 115 outputs the 48 measured values as a small region measurement result for one image.

The small region measuring unit 115 outputs the small region measurement result for each of the low exposure image and the high exposure image. There is a difference corresponding to the setting level difference between the small region measurement result of the low exposure image and that of the high exposure image in general. For example, when the setting level differences is ±2 steps, and when the measured value of a certain small region in the high exposure image is about 10, the measured value of the same small region in the high exposure image will be about 160.

Figure 3:
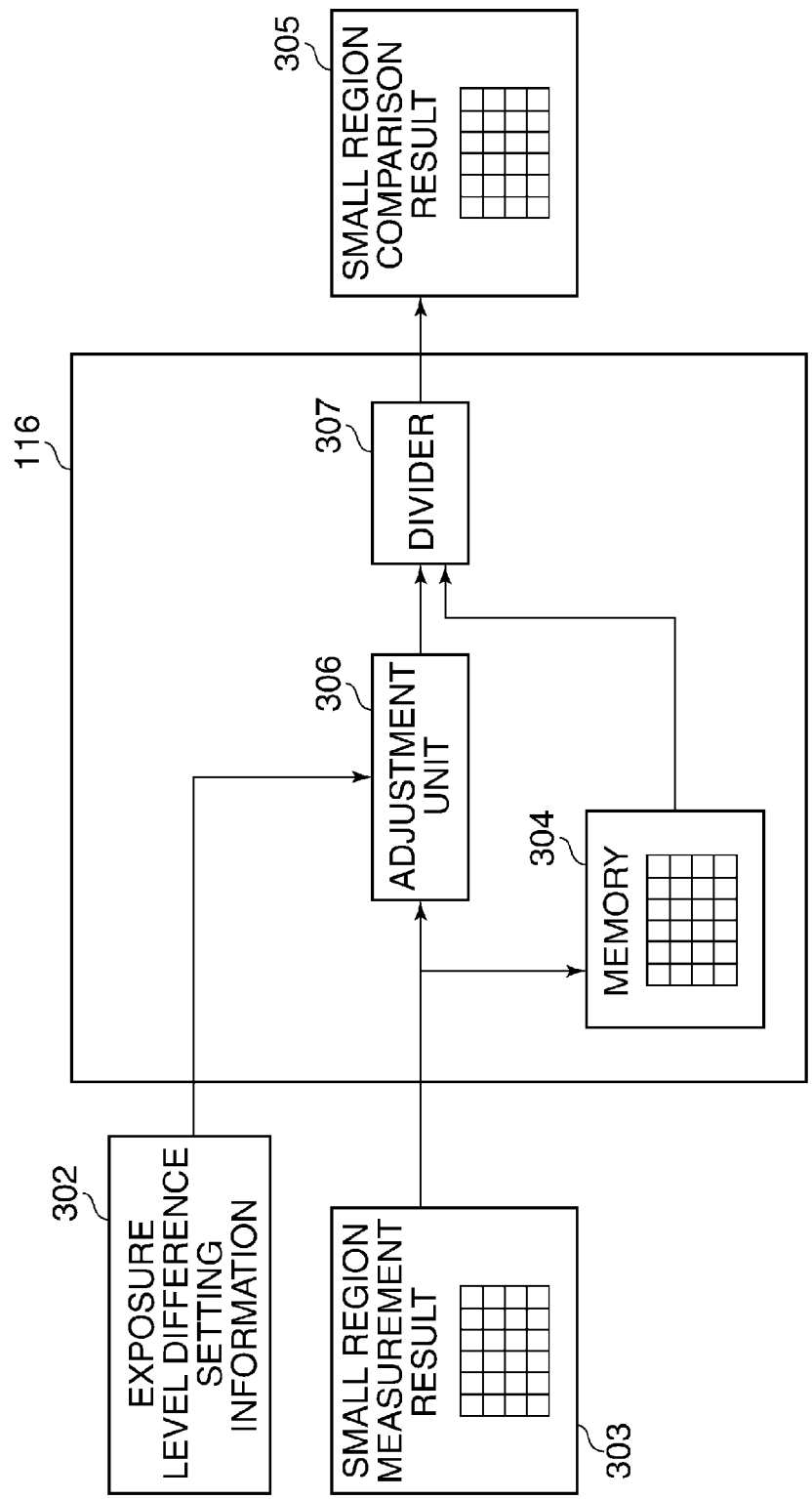
FIG. 3 is a view showing a configuration of a small region comparing unit shown in FIG. 1.

FIG. 3 is a view showing a configuration of the small region comparing unit 116. Exposure level difference setting information 302 is inputted to the small region comparing unit 116 from the exposure level difference setting unit 103, and the small region measurement result 303 is inputted to the small region comparing unit 116 from the small region measuring unit 115. The small region comparing unit 116 performs a predetermined data process based on the exposure level difference setting information 302 and the small region measurement result 303, and outputs a small region comparison result 305.

A memory 304 that the small region comparing unit 116 has can store the small region measurement result 303 inputted into the small region comparing unit 116. The following description is based on premise that the small region measurement result for the low exposure image was beforehand stored in the memory 304, and the small region measurement result 303 for the high exposure image is inputted into the small region comparing unit 116.

The small region comparing unit 116 reads the measured value of the small region at the certain position based on the small region measurement result 303 for the high exposure image and the small region measurement result for the high exposure image stored in the memory 304. For example, when the measured value of the small region of 0-th in the vertical direction and 0-th in the horizontal direction is read from the small region measurement result 303, the measured value of the small region of 0-th in the vertical direction and 0-th in the horizontal direction is also read from the small region measurement result stored in the memory 304.

An adjustment unit 306 multiplies the gain corresponding to the setting level difference to the measured value read from the small region measurement result 303. That is, when the exposure level difference setting information 302 shows that the exposure level difference is set as ±2 steps, the adjustment unit 306 multiplies the gain of $\frac{1}{16}$ times corresponding to the setting level difference of 4 steps to each measured value of the small region measurement result 303 for the high exposure image.

Thus, a divider 307 applies a dividing process to the small region measurement result to which the gain was multiplied and the small region measurement result stored in the memory 304. For example, the divider 307 divides the value that is obtained by multiplying the gain to each measured value of the small region measurement result 303 about the high exposure image by the measured value of the small region measurement result stored in the memory 304. This process is performed for every small region, and the comparison values for all the small regions are finally outputted as a small region comparison result 305. Accordingly, as shown in FIG. 2, when the image is divided into 48 small regions, the small region comparison result 305 comprises 48 comparison values.

Since the small region comparison result 305 outputted from the small region comparing unit 116 is a comparison result between the low exposure image and the high exposure image for every small region, and includes the setting level difference, it becomes a value near 1.0 except the effect of the setting level difference. Although the first embodiment uses the quotient that is obtained by dividing the value (getting it blocked ratio) which did division of the measured value for every small region, the present invention is not limited to this. A difference value of the measured value may be used as a comparison value, for example. In this case, the compound value becomes a value near 0.0.

Figure 4:
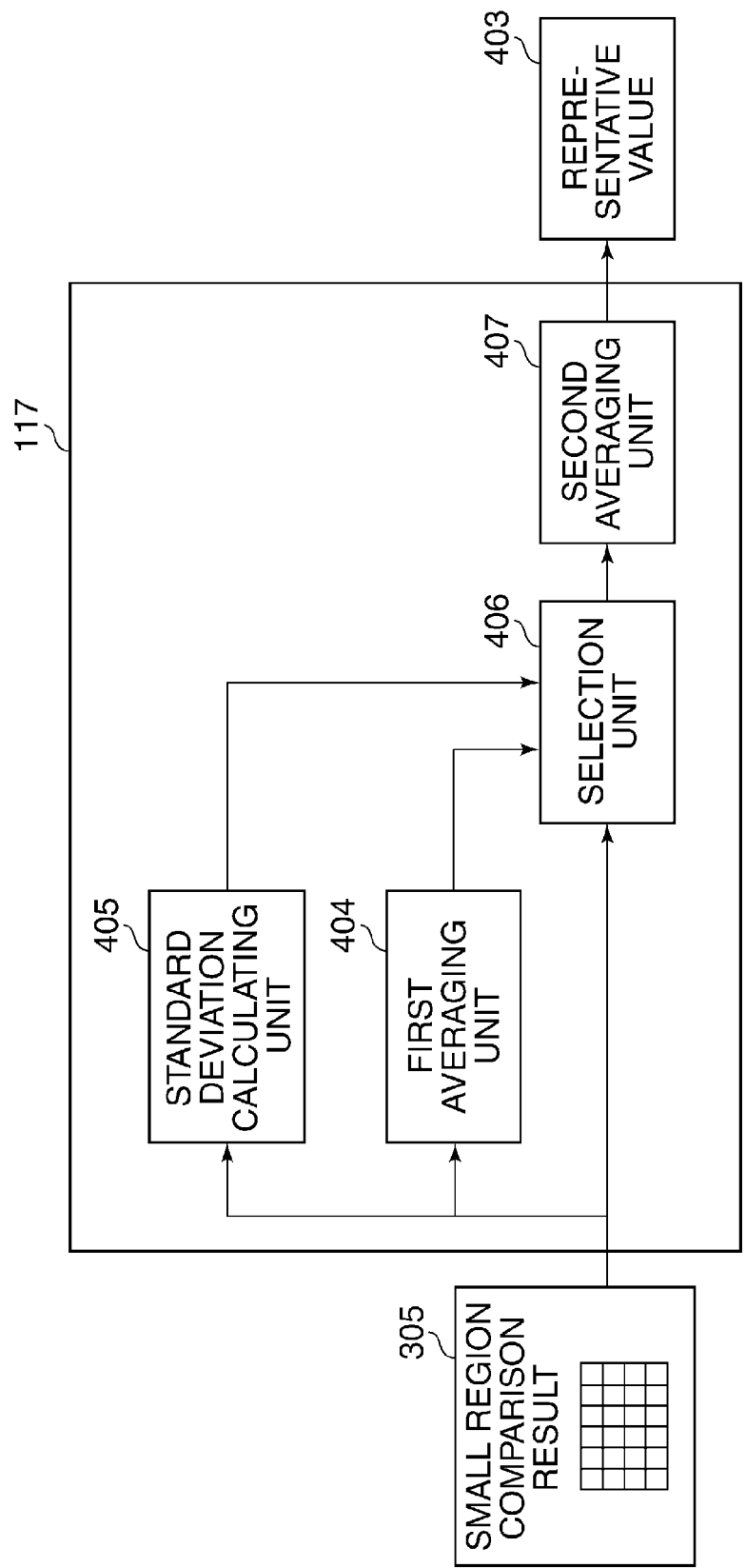
FIG. 4 is a view showing a configuration of a representative-value-calculation unit shown in FIG. 1.

FIG. 4 is a view showing a configuration of the representative-value-calculation unit 117. The representative-value-calculation unit 117 performs a predetermined calculation to the small region comparison result 305 received from the small region comparing unit 116, and outputs a representative value 403. The representative-value-calculation unit 117 calculates one representative value from among a plurality of comparison values (48 values corresponding to the number of small regions in the first embodiment) that comprise the small region comparison result 305.

Specifically, a first averaging unit 404 finds an average value of the comparison values that comprise the small region comparison result 305, and a standard deviation calculating unit 405 finds standard deviation thereof. Then, a selection unit 406 selects a comparison value of which the deviation falls within a fixed range (i.e., the deviation is small) from among the comparison values that comprise the small region comparison result 305. That is, when the comparison values calculated for the respective small regions are represented by "c", the average value of the comparison values "c" is represented by "a", and the standard deviation is represented by "σ", the deviation "s" of the comparison values is calculated by "s=(c−a)/σ". Then, a comparison value of which a deviation "s" is small (it falls within a range of ±2, for example) is selected. As mentioned above, when the small region measuring unit 115 divides the low exposure image and the high exposure image into 48 small regions, respectively, the small region comparison result 305 includes the 48 comparison values. If three comparison values fall outside the range of ±2, the remaining 45 comparison values are selected.

A second averaging unit 407 calculates an average value of the comparison values selected by the selection unit 406 again, and outputs the acquired average value as the representative value 403. When the 45 comparison values are selected as mentioned above, the average value of these 45 comparison values becomes the representative value 403.

Figure 5:
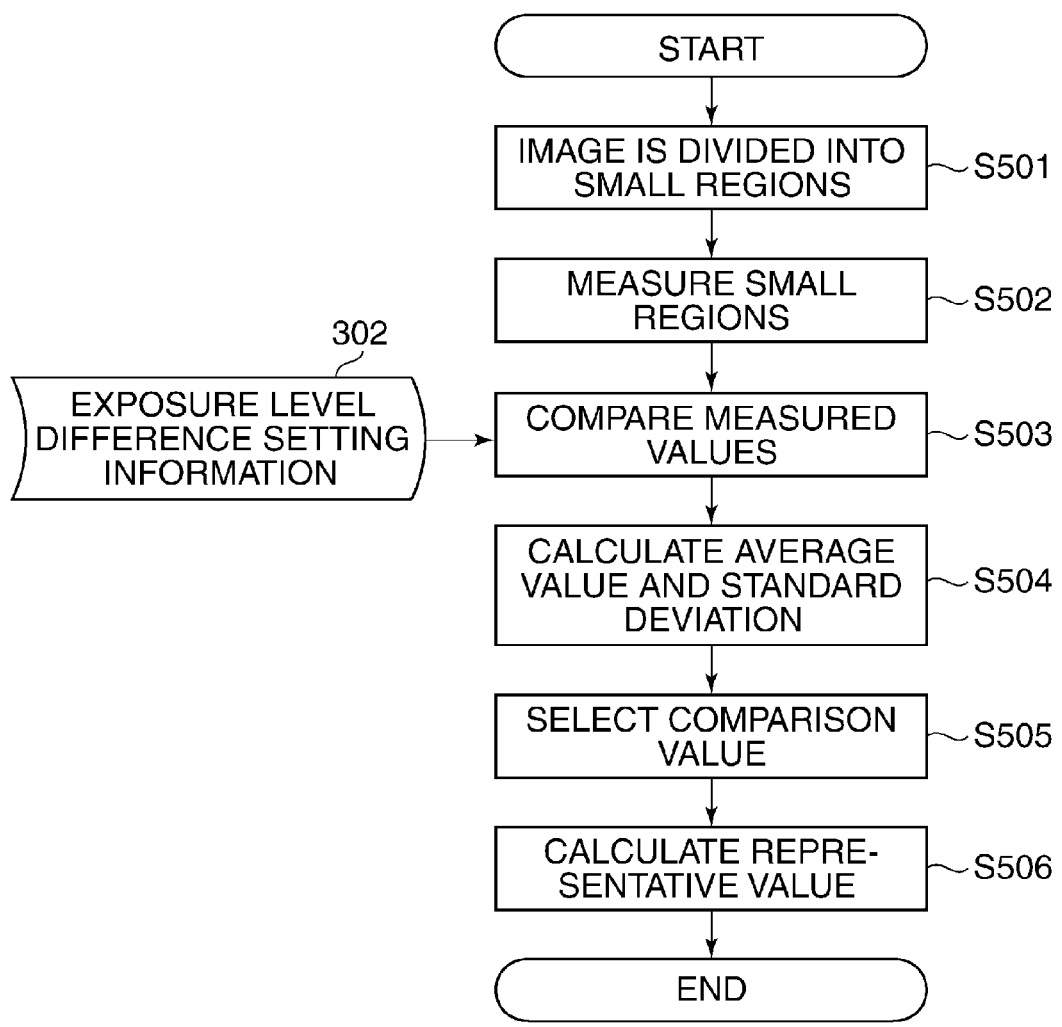
FIG. 5 is a flowchart showing a series of processes executed by the small region measuring unit, small region comparing unit, and representative-value-calculation unit that are shown in FIG. 1.

FIG. 5 is a flowchart showing a series of processes executed by the small region measuring unit 115, the small region comparing unit 116, and the representative-value-calculation unit 117. Steps S501 and S502 are processes executed by the small region measuring unit 115, a step S503 is a process executed by the small region comparing unit 116, and steps S504 through S506 are processes executed by the representative-value-calculation unit 117.

First, the low exposure image and the high exposure image that were inputted are divided into a plurality of small regions as shown in FIG. 2, for example (the step S501). A measured value of brightness values (an average value of brightness values, for example) is measured for image data of each of a plurality of divided small regions (step S502). Then, the measured values of the low exposure image and the high exposure image are compared for every small region (step S503). At this time, the comparison process is performed in consideration of the exposure-level-difference-setting-information 302 (see FIG. 3) about the low exposure image and the high exposure image.

Next, an average value and a standard deviation of the comparison values that were acquired for every small region are calculated (step S504). Next, the deviation of the comparison values is calculated for every small region, and the comparison values of which the deviations fall within the fixed range are selected (step S505). Then, an average value of the selected comparison values is calculated, and the calculated average value is outputted as the representative value (step S506).

The level matching using the representative value 403 calculated by the representative-value-calculation unit 117 will be described with reference to FIG. 1. The representative value 403 calculated by the representative-value-calculation unit 117 can be regarded as the difference in the exposure due to an exposure error that does not include the setting level difference. Accordingly, the level setting unit 106 sets the level based on the level matching gain corresponding to the usual setting level difference plus the exposure error.

For example, the level setting unit 106 sets a fourfold level matching gain for the low exposure image data to the level gain processing unit 108, and sets a quarter level matching gain for the high exposure image data to the level gain processing unit 107 in the level matching corresponding to the usual setting level difference. On the other hand, when the representative value 403 for the low exposure image data as a result of comparison on the basis of the high exposure image data is 0.8, the gain for the low exposure image data becomes 5 times, which is obtained by multiplying 1.25 (an inverse of 0.8) by 4 times, in the level matching that takes into account the exposure error. On the other hand, the level matching gain for the high exposure image data is set to ⅕ times.

Next, after the level gain processing unit 108 reads the low exposure image data from the frame memory 105 and matches the levels, the low exposure image data is sent to the motion detection unit 109, the composition ratio setting unit 110, and the composition ratio control unit 112. On the other hand, after the level gain processing unit 107 matches levels of the high exposure image data that is outputted from the camera signal processing unit 102, the high exposure image data is sent to the motion detection unit 109, the composition ratio setting unit 110, and the composition ratio control unit 111.

After that, the motion detection unit 109 detects motion information in the image by comparing the low exposure image data and the high exposure image data of which levels were matched. For example, the motion detection unit 109 divides both of the low exposure image data and the high exposure image data into certain areas, calculates a difference between an area of the low exposure image data and the corresponding area of the high exposure image data, and determines that the area of which the absolute value of the difference is large is a motion area. The composition ratio setting unit 110 sets a composition ratio based on the luminosity information about the low exposure image data and the high exposure image data, and the information from the motion detection unit 109. That is, the composition ratio is set so that a bright section in an image is mainly composited by the low exposure image data and a dark section of the image is mainly composited by the high exposure image data. The composition ratio setting unit 110 sets the composition ratio about the motion area so as to output either the low exposure image data or the high exposure image data. This can avoid image quality deterioration, such as blur, in the motion area of the image data after composition.

Finally, each of the composition ratio control units 111 and 112 adjusts the composition ratio of the image according to the instruction from the composition ratio setting unit 110, and sends the image data to the image composition unit 113. The image composition unit 113 composites two pieces of the image data, and generates a composite image 114.

Thus, since the levels are set based on the level matching gain corresponding to the usual setting level difference plus the exposure error, the levels of image data outputted from the level gain processing units 107 and 108 are made uniformly. Accordingly, a difference value can be calculated appropriately without occurring discontinuity in the pixel values after composition, even when the motion detection is performed.

According to the first embodiment, even when the position of a part of subjects varies like a case where a taken image includes a moving subject, the value of the exposure error that affects the whole image can be calculated exactly. This will be described with reference to FIG. 6A and FIG. 6B.

Figure 6A:
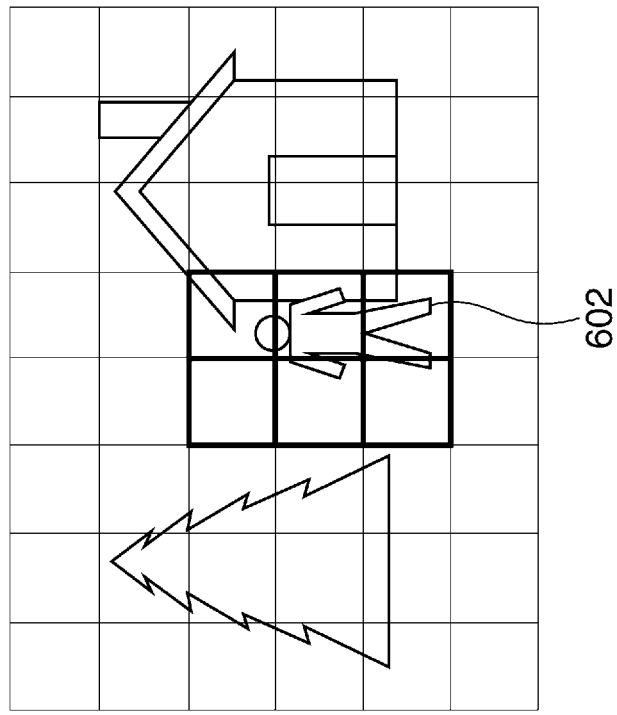
FIG. 6A and FIG. 6B are views showing characteristics of level matching at the time of compositing images that include a moving subject by the image composition apparatus in FIG. 1.
Figure 6B:
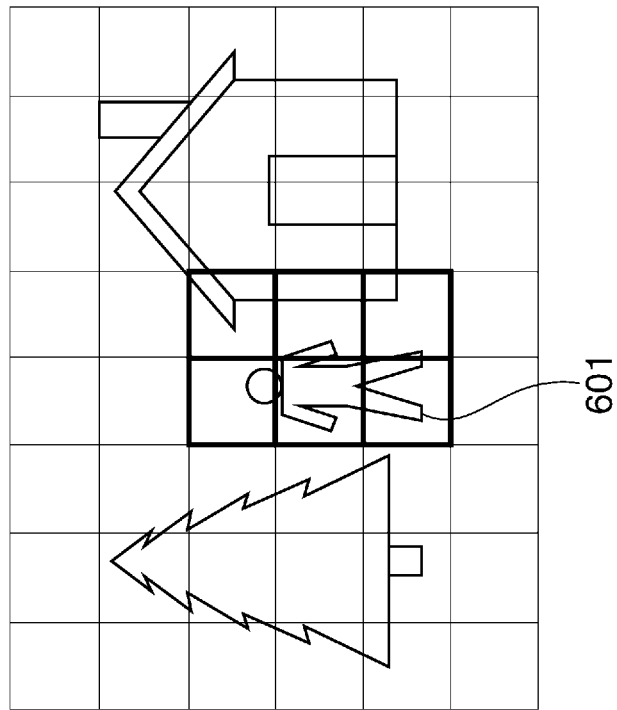

FIG. 6A and FIG. 6B are views showing characteristics of level matching at the time of compositing images that include a moving subject. FIG. 6A shows a taken low exposure image including a person image 601 as a moving subject. FIG. 6B shows a taken high exposure image including a person image 602 that is identical to the person image 601 except its position. The person image is included in the small regions indicated by thick lines in FIG. 6A and FIG. 6B.

The measured value of a small region related to a moving subject that is calculated for every small region differs greatly depending on whether the moving subject exists or not. Accordingly, the comparison value acquired by comparing the measured values about the small regions related to the moving subject is greatly different from the comparison value acquired by comparing the measured values about the small regions (small regions other than the small regions indicated by the thick lines) that are not related to the moving subject. That is, the deviation of the comparison values acquired about the small regions related to the moving subject becomes large.

Accordingly, the comparison values acquired about the small regions related to the moving subject are excepted from the calculation for finding the representative value 403 by the selection unit 406 in the first embodiment. Accordingly, the representative value 403 that shows an overall exposure error can be calculated exactly, without being affected by the existence of a moving subject. As mentioned above, since the levels are appropriately set based on the level matching gain corresponding to the usual setting level difference plus the exposure error indicated by the representative value 403, the levels of image data outputted from the level gain processing units 107 and 108 are made uniformly.

In a second embodiment, image data is divided into small regions, measured values that are detected for every small region are compared for every small region, and distribution of the compared measured values is calculated. Then, the most frequent measured value in the distribution is determined as the representative value, and an exposure error is calculated.

The image composition apparatus according to the second embodiment is different from the image composition apparatus according to the first embodiment in the calculation process for the representative value in the representative-value-calculation unit. The other configurations are identical. Accordingly, this embodiment describes the processing which calculates a representative value in representative-value-calculation unit 117A with which the image composition apparatus concerning a 2nd embodiment is provided.

FIG. 7 is a view schematically showing a configuration of a representative-value-calculation unit 17A with which the image composition apparatus according to the second embodiment is provided. The representative-value-calculation unit 117A has a histogram generation unit 702, a peak detection unit 703, and a resolution setting unit 704. Although the resolution setting unit 704 is a member of the representative-value-calculation unit 117A in the second embodiment, the image composition apparatus may be configured so that the resolution setting unit 704 is independent of the representative-value-calculation unit 117A.

The resolution setting unit 704 sets resolution for determining a class width of a frequency distribution chart generated by the histogram generation unit 702. The histogram generation unit 702 finds the frequency distribution of the small region comparison result 305 (a comparison value for every small region). The peak detection unit 703 sets the representative value 403A to the comparison value with the maximum frequency in the frequency distribution that is found by the histogram generation unit 702.

Specifically, the histogram generation unit 702 sets the class width based on the resolution given from the resolution setting unit 704, distributes the small region comparison result 305 (the comparison values for the respective small regions) to the respective classes, and generates the frequency distribution chart. The peak detection unit 703 detects the class with the maximum frequency in the frequency distribution chart, and regards the medium value of the class width of the class (the center value between the smallest value and the largest value in the class) as the representative value 403A. As long as the sufficient accuracy for correcting the exposure error is acquired, the smallest value or the largest value of the class width of the class with the maximum frequency may be used as the representative value 403A.

FIG. 8A through FIG. 8E are graphs showing examples of frequency distribution charts that are calculated by the representative-value-calculation unit 117A. FIG. 8A is an example of frequency distribution calculated by the histogram generation unit 702. The horizontal axis of the frequency distribution chart indicates the comparison value that comprises the small region comparison result 305, and the class width of each class is set based on the resolution set by the resolution setting unit 704. Since the "class width" is a width of each section used as a unit for totaling a histogram and the "resolution" is a reciprocal of the number of all the classes for finding the histogram, the "class width" is calculated by multiplying the resolution by the entire data range for finding the histogram. The vertical axis of the frequency distribution chart (height of a bar graph) indicates the frequency of each class (the number of the comparison values belonging to each class).

The peak detection unit 703 detects the maximum frequency of the frequency distribution chart calculated by the histogram generation unit 702, and sets the representative value 403A to the medium value of the class. Accordingly, the representative value 403A is the medium value of the class with the maximum frequency in FIG. 8A. The gain value that has the largest effect to the entire screen can be obtained from among the gain values that are generated by the deviation of the exposure from the setting level difference (exposure error).

The second embodiment is able to generate the representative value that is impervious to a moving subject included in a subject as compared with the first embodiment. This will be described with reference to FIG. 8A through FIG. 8E, FIG. 6A, and FIG. 6B.

FIG. 8A shows the frequency distribution of the small region comparison result 305 when an image is taken with exposure different from the setting level difference without influence of a moving subject. The representative value 403 calculated in the first embodiment is different from the representative value 403A calculated in the second embodiment, but the difference is small as shown in FIG. 8A. In this case, even if the representative value is determined using either of the representative-value-calculation method of the first embodiment or that of the second embodiment and applies correction gain to image data, the image qualities are hardly different. Accordingly, either of the representative value 403 or the representative value 403A may be used.

However, when a part of subject moves between shootings of a low exposure image and a high exposure image (i.e., when a moving subject is included in a subject), the comparison values included in the small region comparison result 305 of the first embodiment are quite different from that of the second embodiment in the small regions in which the moving subject is included. FIG. 8B shows the frequency distribution of the small region comparison result 305 when the moving subject that is a part of the subject moves between shootings of a low exposure image and a high exposure image. The relation between the representative value 403 calculated in the first embodiment and the representative value 403A calculated in the second embodiment in FIG. 8B is different from that in FIG. 8A.

That is, the frequency of the class of which the comparison value is larger than 1.0 and the frequency of its counterpart class of which the comparison value is smaller than 1.0 in the small region comparison result 305 become large in the small regions in which the moving subject is compared with a background image because of the difference between the measured values of the moving subject and the background image. This relation relates to the fact that a region that contains the moving subject in the first image (FIG. 6A) does not contain the moving subject in the second image (FIG. 6B) but a region that contains the moving subject in the second image does not contain the moving subject in the first image.

In the following description, the measured value of the small region containing the background image is represented by a constant value "$\alpha$", and the measured value of the small region containing the moving subject is represented by a constant value "$\beta$". In this case, the comparison value of the small region containing the moving subject in the first image is $\alpha/\beta$, and the comparison value of the small region containing the moving subject in the second image is $\beta/\alpha$ that is a reciprocal of the comparison value in the first image. That is, the comparison value of the small region containing the moving subject in the low exposure image is nearly equal to the reciprocal of the comparison value of the small region containing the high exposure image. Accordingly, the frequencies of the comparison value of the small regions that are affected by the moving subject concentrate on the classes 901 in FIG. 8B. However, this is not viable when the measured value of the background image or the measured value of the moving subject varies.

If the representative-value-calculation method of the first embodiment is used in such a case, the representative value 403 affected by the moving subject will be calculated as shown in FIG. 8B because the average value (the comparison value selected by the selection unit 406) of the small region comparison result 305 becomes the representative value. On the other hand, when the representative-value-calculation method of the second embodiment is used, the representative value 403A, which is the same value as shown in FIG. 8A, is determined as shown in FIG. 8B because the class with the maximum frequency in the frequency distribution is selected. This enables to apply the correction gain that is impervious to a moving subject to the image data.

In the second embodiment, it is important to set the suitable class width in the frequency distribution chart generated by the histogram generation unit 702 in order to calculate the suitable representative value 403A. That is, the setting of the resolution by the resolution setting unit 704 becomes important. This will be described with reference to FIG. 8C through FIG. 8E.

FIG. 8C through FIG. 8E are frequency distribution charts showing the frequency distributions of a plurality of comparison values that comprise the small region comparison result 305 with different class widths. FIG. 8C is a frequency distribution chart with the same class width as FIG. 8A, FIG. 8D is a frequency distribution chart of which the class width is too fine (the resolution is too high), and FIG. 8E is a frequency distribution chart of which the class width is too coarse (the resolution is too low).

When the class width is too fine as shown in FIG. 8D, the representative value 403A cannot be calculated in a case where there are a plurality of classes with the maximum frequency. On the contrary, when the class width is too coarse as shown in FIG. 8E, since one class with the maximum frequency tends to be obtained, the representative value 403A can be calculated easily, but the accuracy of the representative value 403A decreases. Accordingly, it becomes important to set the class width so as to obtain the representative value 403A while keeping the accuracy of representative value 403A suitable.

As a standard for calculating the resolution of suitable class width, there is a method on the basis of a gradation number required for expression of an image, for example. This is the method of setting the resolution of suitable class width to "1/n", where the gradation number required for expression of an image is set to "n (n is a natural number)". Specifically, when the gradation number required for expression of an image is 8 bits, 256 values (0 through 225) are expressed, and the resolution is $1/256$. However, the suitable resolution is not limited to this, and finer or coarser resolution may be set as long as the resolution is close to 1/n in the order of magnitude.

Figure 9:
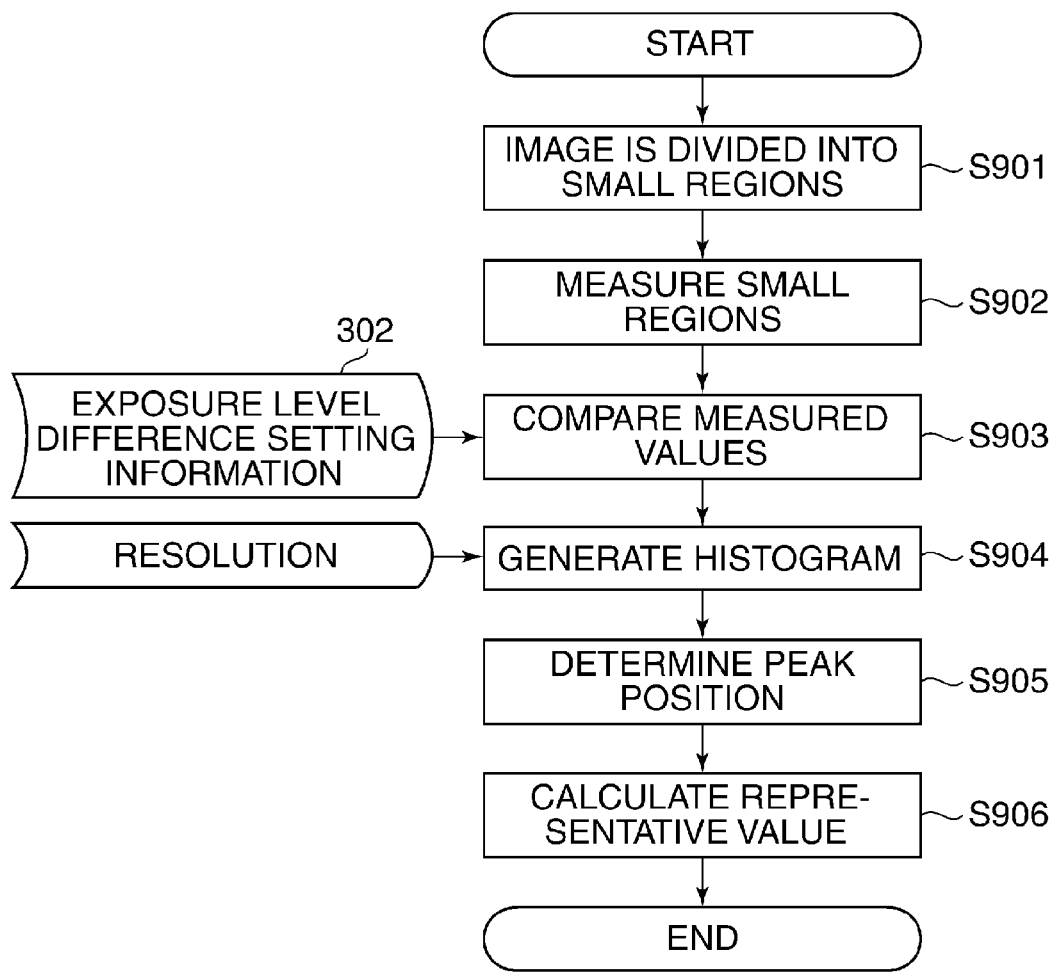
FIG. 9 is a flowchart showing a series of processes executed by the small region measuring unit, small region comparing unit, and representative-value-calculation unit with which the image composition apparatus according to the second embodiment is provided.

FIG. 9 is a flowchart showing a series of processes executed by the small region measuring unit 115, the small region comparing unit 116, and the representative-value-calculation unit 117A with which the image composition apparatus according to the second embodiment is provided. Since the process in steps S901 through S903 shown in the flowchart in FIG. 9 is identical to the process in the steps S501 through S503 in the flowchart shown in FIG. 5 about the first embodiment, the description therefor will be omitted.

In step S904, the histogram generation unit 702 calculates distribution of the comparison value for every small region that comprises the small region comparison result 305, and generates a frequency distribution chart. At the time, the resolution setting unit 704 determines resolution of the frequency distribution chart according to the bit depth of the input image data, and the histogram generation unit 702 generates a frequency distribution chart based on the resolution that was determined by the resolution setting unit 704. Next, in step S905, the peak detection unit 703 detects a class with the maximum frequency from the created frequency distribution chart, and calculates the value as the representative value.

Under the condition where the resolution (1/n) set by the resolution setting unit 704 is used, there may be a plurality of classes with the maximum frequency in the frequency distribution chart generated by the histogram generation unit 702. In this case, it is considered that the set class width (resolution) is too fine as described with reference to FIG. 8D, and the peak detection unit 703 cannot determine a representative value.

Accordingly, the peak detection unit 703 notifies the histogram generation unit 702 that a representative value cannot be determined. Receiving the notice, the histogram generation unit 702 generates a frequency distribution chart again after changing the class width. Then, the peak detection unit 703 tries to determine a representative value again. The generation of a frequency distribution chart is repeated until one class with the maximum frequency is fixed and a representative value is determined. At this time, the histogram generation unit 702 changes the class width to "m/n, (m>1)" or "1/(n−m), (0<m<n)", for example.

A level of image data is adjusted using the representative value obtained by the method mentioned above. Since the process to composite images of which the levels were adjusted is identical to that of the first embodiment, the description therefor is omitted.

In the second embodiment, an image is divided into small regions, measured values are found for every small region, a comparison value is calculated for every small region based on the found measured values, the class (i.e., the comparison value) with the maximum frequency is regarded as a representative value in a frequency distribution chart of the comparison values, and an exposure error is calculated based on the representative value. Thereby, a composite image with an improved image quality that is impervious to a moving subject can be obtained even in a scene where the moving subject is included in a subject as compared with the representative-value-calculation method of the first embodiment.

Although the embodiments of the invention have been described, the present invention is not limited to the above-mentioned embodiments, the present invention includes various modifications as long as the concept of the invention is not deviated.

For example, although the above-mentioned embodiments describe the image processing apparatus that generate a composite image by adjusting levels of two or more pieces of image data with different exposures, a composite image may be generated by adjusting levels of two or more pieces of image data with the same exposure. This is effective for a case where shutter speed becomes slow and image quality deteriorates due to blur when taking one image. That is, two images are taken with shutter speed that is a half shutter speed for taking one image (exposure time is halved). Thus, the exposure errors of the two images taken are corrected, and the composition ratio control unit 111 is adjusted so that the two images are composited with an equal ratio for all the pixel values. Thereby, the shutter speed increases and an image without image quality deterioration due to blur can be acquired. Thus, when the image composition that is not frequency range expansion is performed, the exposure error due to physical factors, such as mechanical constitution, is absorbed, and a moving subject can be detected with sufficient accuracy.

The composition ratio control units 111 and 112 may be adjusted so that two images are outputted without compositing the two images. For example, when two or more images are taken with the same shutter speed, the images that are different in brightness may be generated. At this time, the images of the same brightness can be generated by detecting the exposure difference between the image data used as a standard and other image data and adjusting the levels corresponding to the exposure difference by the level gain processing units 107 and 108. Thus, when the present invention is used, since luminance levels of images that are useful as a group (for example, continuous shooting images that are not composited) can be adjusted, a visual sense of incongruity is prevented, and images useful to an image composition in a post-process can be generated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-050282, filed on Mar. 7, 2012, which is hereby incorporated by reference herein in its entirety.

What is claimed is:

1. An image composition apparatus comprising:
an image pickup unit configured to take an optical image of a subject;
an exposure-level-difference setting unit configured to set different exposures when the images are taken;
a small region measuring unit configured to divide each of the images taken by said image pickup unit with the exposures set by said exposure-level-difference setting unit into small regions, and to find a measured value based on brightness values in each of the small regions;
a small region comparing unit configured to calculate a comparison value for each of the small regions based on the measured value of a small region of one image and the measurement value of the same small region of another image;
a representative value calculation unit configured to calculate a representative value based on the comparison values calculated for the respective small regions;
a level setting unit configured to set a level-matching gain used for compositing the image data of the images based on an exposure level difference set by said exposure-level-difference setting unit and the representative value calculated by said representative value calculation unit; and
a composition unit configured to composite the image data of the images of which the image levels are adjusted by multiplying the gain set by said level setting unit.

2. The image composition apparatus according to claim 1, wherein said small region measuring unit finds one of an average value, the minimum value, and the maximum value of the brightness values for each of the small regions as the measured value.

3. The image composition apparatus according to claim 1, wherein said small region comparing unit regards one of a ratio and a difference of the measured values of the small regions at the same position in the respective images as the comparison value for each of the small regions.

4. The image composition apparatus according to claim 1, wherein the images includes a low exposure image and a high exposure image, and said small region comparing unit regards one of a ratio and a difference of a value that is obtained by multiplying a gain corresponding to the exposure level difference set by said exposure-level-difference setting unit to the measured value of each of the small regions in the high exposure image and the measured value of the same small region in the low exposure image as the comparison value for the small region.

5. The image composition apparatus according to claim 1, wherein said representative value calculation unit calculates an average value and standard deviation of the comparison values found for the respective small regions by said small region comparing unit, selects the comparison values of which deviations fall within a fixed range from among the comparison values found for the respective small regions, and regards an average value of the selected comparison values as the representative value.

6. The image composition apparatus according to claim 1, wherein said representative value calculation unit finds frequency distribution by distributing the comparison values calculated for the respective small regions to classes having a predetermined class width, and regards a medium value in the class with the maximum frequency in the frequency distribution as the representative value.

7. The image composition apparatus according to claim 6, wherein said representative value calculation unit sets the resolution of the class width to 1/n, where the gradation number required for expression of the images is n.

8. The image composition apparatus according to claim 7, wherein said representative value calculation unit expands the class width and refinds the frequency distribution when there are the classes with the maximum frequency in the frequency distribution, and regards the medium value of the class with the maximum frequency in the re-found frequency distribution as the representative value.

9. The image composition apparatus according to claim 8, wherein said representative value calculation unit changes the class width again and refinds the frequency distribution when there are the classes with the maximum frequency in the re-found frequency distribution, and repeats the change of the resolution until one class with the maximum frequency is fixed in the re-found frequency distribution.

10. The image composition apparatus according to claim 1, wherein the images includes a low exposure image and a high exposure image, and said level-setting unit sets the level-matching gain for image data of the low exposure image to a value that is obtained by dividing the exposure level difference by the representative value, and sets the level-matching gain for image data of the high exposure image to a reciprocal of the level-matching gain set for image data of the low exposure image.

11. An image composition method executed with an image composition apparatus having an image pickup unit that takes an optical image of a subject, the method comprising:

an exposure-level-difference setting step of setting different exposures when the image pickup unit takes images of the subject;

an image pickup step of taking images of the subject with the exposures set in said exposure-level-difference setting step;

a small region measuring step of dividing each of the images taken in said image pickup step, and of finding a measured value based on brightness values in each of the small regions;

a small region comparing step of calculating a comparison value for each of the small regions based on the measured value of a small region of one image and the measurement value of the same small region of another image;

a representative value calculation step of calculating a representative value based on the comparison values calculated for the respective small regions;

a level setting step of setting a level-matching gain used for compositing the image data of the images based on the exposure level difference set in said exposure-level-difference setting step and the representative value calculated in said representative value calculation step; and a composition step of compositing the image data of the images of which the image levels are adjusted by multiplying the gain set in said level setting step.

* * * * *